United States Patent [19]

Bücker

[11] Patent Number: 5,799,679
[45] Date of Patent: Sep. 1, 1998

[54] DEVICE FOR WASHING THE CUPS IN A MILKING HEAD

[75] Inventor: Heinrich Bücker, Langenberg, Germany

[73] Assignee: Westfalia Separator AG, Oelde, Germany

[21] Appl. No.: 737,810
[22] PCT Filed: Apr. 12, 1995
[86] PCT No.: PCT/EP95/01353
§ 371 Date: Nov. 14, 1996
§ 102(e) Date: Nov. 14, 1996
[87] PCT Pub. No.: WO95/32615
PCT Pub. Date: Dec. 7, 1995

[30] Foreign Application Priority Data

May 26, 1994 [DE] Germany .................. 44 18 300.3

[51] Int. Cl.⁶ ...................................... B08B 9/02
[52] U.S. Cl. .............. 134/152; 134/166 C; 134/169 C; 134/168 C; 134/166 R; 134/170
[58] Field of Search ................. 134/152, 146, 134/144, 153, 166 R, 167 R, 166 C, 168 R, 168 C, 169 R, 169 C, 170, 22.18, 22.12

[56] References Cited

U.S. PATENT DOCUMENTS

| | | | |
|---|---|---|---|
| 2,650,179 | 8/1953 | Anderson | 134/22.18 |
| 2,691,381 | 10/1954 | Strunck et al. | 134/152 |
| 3,012,566 | 12/1961 | Baker | 134/152 |
| 3,040,755 | 6/1962 | Sigmon | 134/169 C |
| 3,958,584 | 5/1976 | Jones | 134/166 C |
| 3,964,526 | 6/1976 | Sindermann | 134/152 |
| 4,964,444 | 10/1990 | Hanerus | 134/170 |
| 5,405,452 | 4/1995 | Anderson et al. | 134/22.12 |

FOREIGN PATENT DOCUMENTS

| | | | |
|---|---|---|---|
| 79810 | 11/1953 | Denmark | 134/166 C |
| 145569 | 6/1954 | Switzerland | 134/166 C |
| 153208 | 1/1956 | Switzerland | 134/24 |

*Primary Examiner*—Frankie L. Stinson
*Attorney, Agent, or Firm*—Sprung Kramer Schaefer & Briscoe

[57] ABSTRACT

A device for washing the teat cups in a milking head, comprising an axially displaceable milking-head holder and a fitting therefor having rinsing nipples over which teat cups fit, wherein the milking-head holder has an axis which is eccentric to an axis of the fitting, and wherein the milking-head holder has an alignment rod mounted for sliding movement back and forth axially in a guide sleeve and whereas the device operates in a specific position wherein the axes of the milking-head holder and the milking-head fitting deviate from the vertical.

5 Claims, 2 Drawing Sheets

DEVICE FOR WASHING THE CUPS IN A MILKING HEAD

BACKGROUND OF THE INVENTION

The present invention concerns a device for washing the cups in a milking head. The device comprises an axially displaceable milking-head holder and a fitting therefor. The cups fit over rinsing nipples on the milking-head fitting. The axis of the milking-head holder is eccentric to that of the fitting. The milking-head holder has an alignment rod.

A device of this type is known for example from U.S. Pat. No. 3,012,566. The alignment rod is a rack that engages a manually operated pinion. Milking heads of different sizes dictate a considerable rotation of the pinion to properly position the milking heads vertically while the cups are being rinsed. If this adjustment is neglected, the cups may not rest correctly against the rinsing nipples, and rinsing will be unsatisfactory.

Another teat-cup rinsing device is known from German GM 8 001 234. It is accommodated both in the parlor and immediately next to the machinery in a separate room. The milking-head fitting and nipples are fastened horizontal into the device in a specific position. The cups are introduced into the device vertically, with their openings resting against the nipples. A manifold communicates with the cups by way of short sections of milk-removal hose and is suspended above the cups in the milking-head holder. Since the distance between the milking-head holder and the rinsing nipples is fixed, unavoidable differences in the size of the milking heads will induce kinks in the milk-removal hose sections.

Sometimes the cups will not rest absolutely perpendicular over the rinsing nipples and hence with their openings flat, and the connection can leak. Rinsing will be unsatisfactory. When the milking-head holder is too high, the cups will not be able to reach the nipples at all. Even when the milking-head holder is correctly adjusted, it will be impossible to position appropriately if the milking head is provided, as is now conventional, with cups of different heights and short milk removal hose sections.

Inserting the cups into and extracting them from the device is also especially difficult. They need to be introduced into cutouts in a holder and can accordingly not be extracted automatically by using one of the cylinders usually employed today for milking to pull on a release cord.

SUMMARY OF THE INVENTION

The object of the present invention is to improve the generic teat-cup rinsing device by facilitating adjustment of the milking head holder.

This object is attained in accordance with the present invention in that the alignment rod slides easily back and forth axially in a guide sleeve and in that the overall device can operate in a specific position wherein the axes of the milking-head holder and the milking-head fitting deviate from the vertical.

Since the milking-head holder slides back and forth only inside the milking-head guide sleeve, it can easily be adjusted to milking heads of various dimensions. The deviation of the axes from the vertical generates friction in the guide sleeve. The friction partly compensates for the weight of the sleeve and accordingly relieves the short milk-removal hose sections. The ratio of weight compensation to the other forces acting on the rinsing nipples can be optimized by varying the device's slope.

The milking-head alignment rod in one advantageous embodiment of the present invention is prevented from rotating in the guide sleeve. This approach compensates for forces of deflection generated by communicating hoses, and the milking head will remain secured at the center of the milking-head fitting.

Another advantageous embodiment of the present invention is characterized in that the milking-head fitting is loosely attached to the teat-cup rinsing device, automatically compensating for differences in the lengths of the individual teat cups.

The rinsing nipples in another advantageous embodiment are loosely attached to the milking-head fitting. The result is a secure seal between the rinsing nipples and the teat cups even when the cups are not precisely perpendicular to the milking-head fitting.

The device in another embodiment can be swung out of the in operation position and into an out-of-operation position away from the operator, where it will not impede or injure him.

BRIEF DESCRIPTION OF THE DRAWING

One embodiment of the present invention will now be specified with reference to the attached drawing, wherein.

DETAILED DESCRIPTION OF THE INVENTION

Figure 1:
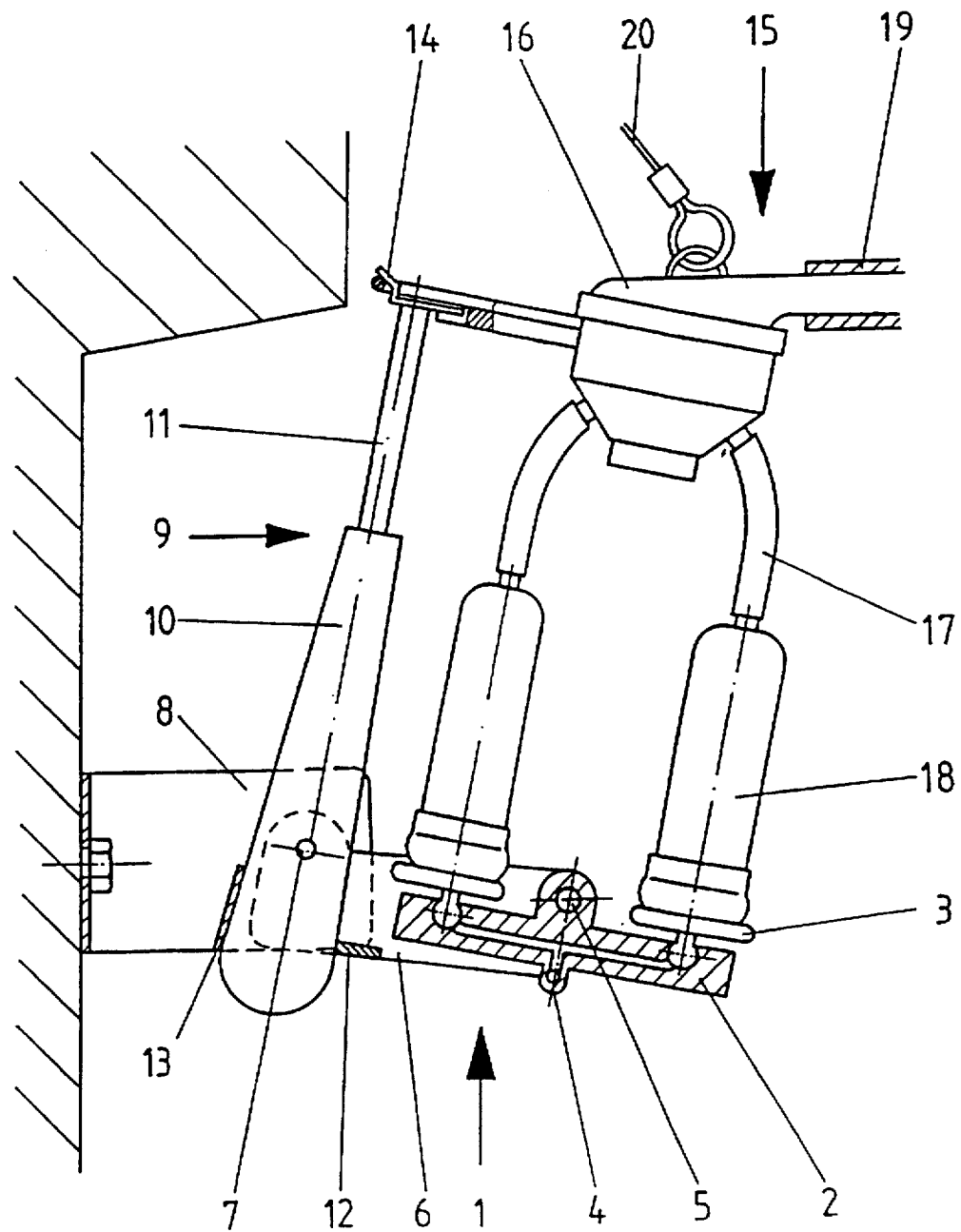
FIG. 1 illustrates the teat-cup rinsing device in operation and FIG. 2 illustrates the device of FIG. 1 out of operation.

A device 1 for rinsing teat cups has a milking-head fitting 2. Milking-head fitting 2 is provided with rinsing nipples 3. Nipples 3 communicate with a rinse line 4. Fitting 2 pivots around an axis 5 of articulation in a holder 6. Milking-head fitting holder 6 itself pivots around another axis 7 of articulation. Second axis 7 of articulation is accommodated on a stationary bracket 8. A milking-head holder 9 also pivots around second axis 7 of articulation. Milking-head holder 9 includes a alignment rod 11 that slides back and forth in a guide sleeve 10. Fitting holder 6 and bracket 8 are provided with stops 12 and 13 that maintain them in an in-operation position wherein the axes of symmetry of milking head holder 9 and teat-cup cluster accommodation 2 deviate from the vertical. At the top of milking-head alignment rod 11 is a catch 14 for suspending a milking head 15. Milking head 15 includes a manifold 16 that communicates by way of short sections 17 of milk-removal hose with teat cups 18. Teat cups 18 rest with their openings flat over rinsing nipples 3. Manifold 16 communicates by way of a long section 19 of milk-removal hose with an unillustrated milk-supply line and is attached by a release cord 20 to an unillustrated piston-and-cylinder mechanism.

How the teat cups are rinsed will now be described.

Milking head 15 is suspended by manifold 16 from the catch 14 at the top of milking-head alignment rod 11. Alignment rod 11 is raised to allow teat cups 18 to be positioned on rinsing nipples 3. Rod 11 will then slide into milking-head guide sleeve 10 until teat cups 18 rest tight enough against rinsing nipples 3. Friction occurs in guide sleeve 10 due to the torque generated by the weight of milking head 15. The deviation from the vertical of the axes of symmetry of milking-head holder 9 and milking-head fitting 2 increases the friction considerably. The augmented friction compensates to some extent for the weight of manifold 16 and accordingly relieves the short sections 17 of milk-removal hose, which will not kink.

The inability of milking-head alignment rod 11 to rotate in milking-head guide sleeve 10 compensates for any deflecting forces generated by the hoses, and milking head 15 will remain centered with respect to milking-head fitting 2.

Differences between the lengths of the individual cups 18 that derive from differences in the longitudinal or transverse extent to which short sections 17 of milk-removal hose are attached or from expansion and contraction of the alternately pressurized and depressurized cups will be automatically compensated by the loose attachment of milking-head fitting 2 to teat-cup rinsing device 1.

Even when teat cups 18 are not precisely perpendicular to milking head fitting 2 because of tension on short sections 17 of milk removal hose, a tight seal will be ensured by the loose attachment of rinsing nipples 3 to fitting 2.

The teat cups are rinsed conventionally and the milking head 15 lifted by tugging on release cord 20, subsequent to which manifold 16 will automatically detach itself from catch 14 and milking-head alignment rod 11 automatic drop back into sleeve 10.

Figure 2:
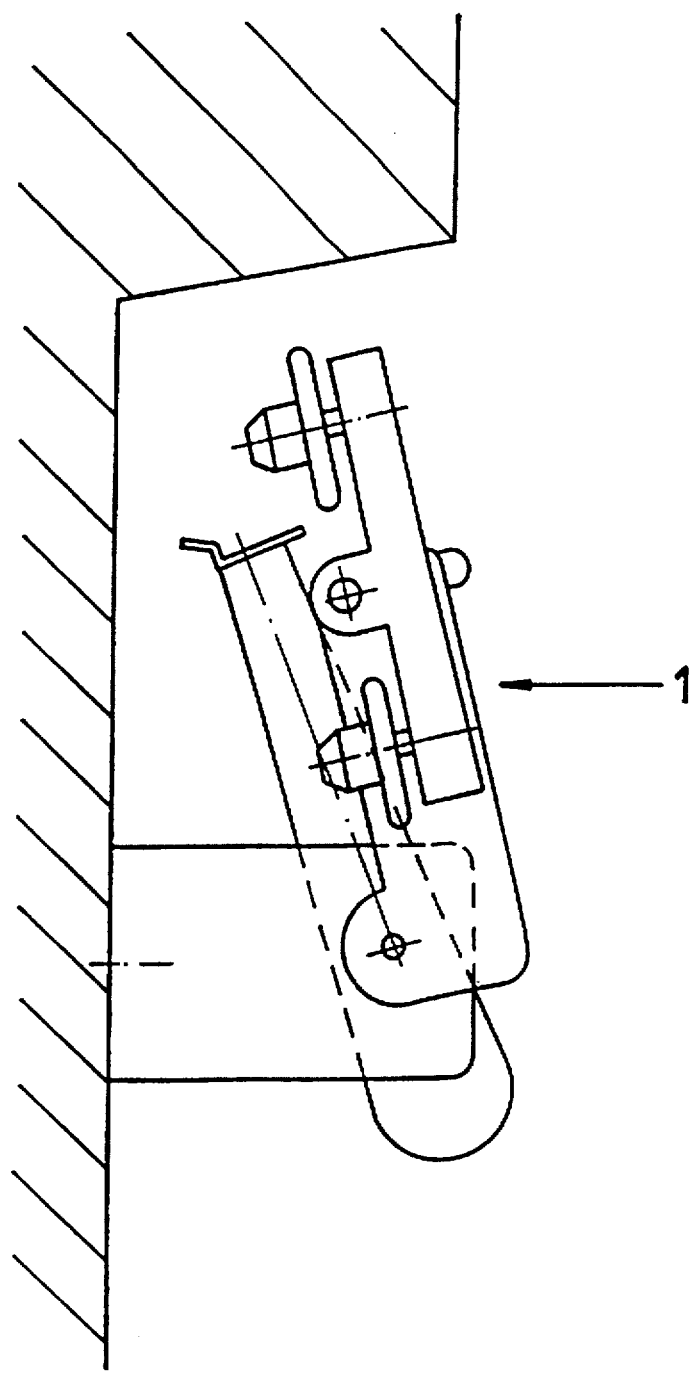

Teat-cup rinsing device 1 can now be pivoted into the out-of operation position illustrated in FIG. 2. In this position it will be out of the operator's way, and he will not be impeded or injured carrying out his assignments.

What is claimed is:

1. A device for washing teat cups in a milking head, comprising an axially displaceable milking-head holder and a fitting therefor having rinsing nipples over which teat cups fit, wherein the milking-head holder has an axis which is eccentric to an axis of the fitting, and wherein the milking-head holder has an alignment rod mounted for sliding movement back and forth axially in a guide sleeve and whereas the device operates in a specific position wherein the axes of the milking-head holder and the milking-head fitting deviate from the vertical.

2. The device as in claim 1, wherein the milking-head alignment rod is prevented from rotating in the guide sleeve.

3. The device as in claim 1, wherein the milking-head fitting is loosely attached to the device.

4. The device as in claim 1, wherein the rinsing nipples are loosely attached to the milking-head fitting.

5. The device as in claim 1, wherein the device is swingable from an in-operation position into an out-of-operation position.

* * * * *